US006011966A

United States Patent [19]

Ono et al.

[11] Patent Number: 6,011,966

[45] Date of Patent: Jan. 4, 2000

[54] MIXER INPUT CIRCUIT WITH IMBALANCE-BALANCE CIRCUIT HAVING DISTRIBUTED CONSTANT LINE

[75] Inventors: Jun Ono; Toru Suda, both of Kanagawa, Japan

[73] Assignee: Sony Corporation, Tokyo, Japan

[21] Appl. No.: 08/047,498

[22] Filed: Apr. 19, 1993

[30] Foreign Application Priority Data

May 8, 1992 [JP] Japan .................................... 4-141978

[51] Int. Cl.[7] ........................................................ H04B 1/26

[52] U.S. Cl. ........................... 455/325; 455/326; 455/319

[58] Field of Search ..................................... 455/325–330, 455/333, 323, 319, 320, 193.1, 193.2; 333/25, 26, 175; 334/41, 45, 64, 78

[56] References Cited

U.S. PATENT DOCUMENTS

| | | | |
|---|---|---|---|
| 4,619,001 | 10/1986 | Kane | 455/326 |
| 4,651,344 | 3/1987 | Hasegawa et al. | 455/325 |
| 4,864,644 | 9/1989 | Takahashi et al. | 455/325 |

FOREIGN PATENT DOCUMENTS

| | | | |
|---|---|---|---|
| 0419756 | 4/1991 | European Pat. Off. | H01P 5/10 |
| 2084809 | 4/1982 | United Kingdom | H01F 27/28 |

*Primary Examiner*—Thanh Cong Le
*Attorney, Agent, or Firm*—Jay H. Maioli

[57] ABSTRACT

A mixer input circuit for converting a signal from a tuning section of an unbalanced type into a balanced signal and outputting the signal. In the mixer input circuit, an RF signal from an input terminal amplified by an RF amplifier is transmitted to a tuning circuit section employing a distributed constant line. A central conductor of the distributed constant line in the tuning circuit section is electromagnetically combined with a second central conductor, thereby constituting an imbalance-balance conversion section. A middle point of the second central conductor on an output side of the imbalance-balance conversion section is grounded, and a balanced output signal from both ends is transmitted to a mixer, so as to be converted into an IF signal and then to be output from an output terminal. With the present mixer input circuit, imbalance-balance conversion can be carried out without using a transformer, and a reduction in size can be realized due to the absence of deterioration of performance.

3 Claims, 3 Drawing Sheets

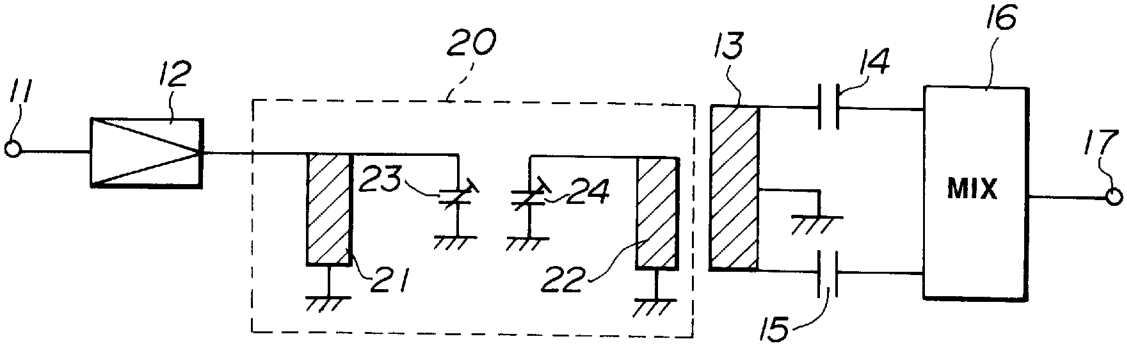
FIG.3
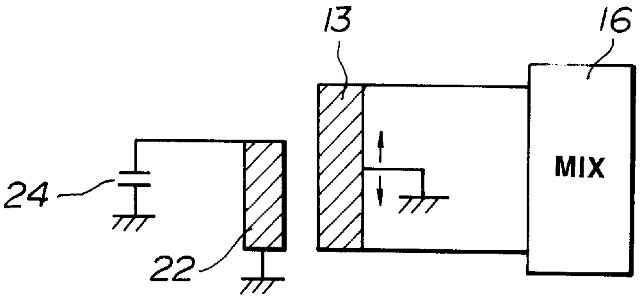
FIG.4
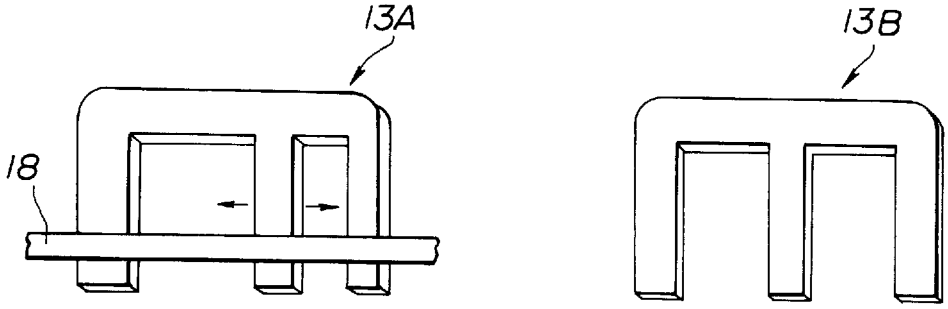
FIG.5(A)
FIG.5(B)

MIXER INPUT CIRCUIT WITH IMBALANCE-BALANCE CIRCUIT HAVING DISTRIBUTED CONSTANT LINE

BACKGROUND OF THE INVENTION

1. Field of Invention

This invention relates to a mixer input circuit, and particularly to a mixer input circuit for converting signals from an unbalanced-type tuning section into balanced signals and inputting the signals to a mixer.

2. Description of the Related Art

In order to optimize noise figures for an input circuit for inputting to a mixer of a so-called UHF tuner, it is conventionally known to carry out balanced input to the mixer. However, a radio frequency (RF) tuning section of a conventional tuning circuit is of an unbalanced type.

FIG. 1, for instance, shows an example of the conventional mixer input circuit.

Referring to FIG. 1, an RF signal from an antenna is transmitted via an RF input terminal 51 to an RF amplifier 52 so as to be amplified. The amplified RF signal is then transmitted to a first input terminal of an imbalance-balance conversion circuit 53 made up of an inductance element such as a coil. The first input terminal is grounded via a trimmer capacitor 54 while the other input terminal is grounded. An output signal from a first output terminal of the imbalance-balance conversion circuit 53 is transmitted via a capacitor 55C and a coil 55L to a first input terminal of a mixer 61. An output signal from the other output terminal of the imbalance-balance conversion circuit 53 is transmitted via a capacitor 56C and a coil 56L to the other input terminal of the mixer 61. The pair of output terminals of the imbalance-balance conversion circuit 53 are connected to each other through a trimmer capacitor 58. An oscillation output signal is supplied from a local oscillator 62 to the mixer 61, so as to be frequency-converted into an intermediate frequency (IF) signal and then to be taken out from an output terminal 63.

FIG. 2 shows another example of the conventional mixer input circuit. Referring to FIG. 2, an RF signal obtained from an input terminal 51 via an RF amplifier 52 is transmitted via a tuning circuit section 65 made up of a capacitor and coils to an imbalance-balance conversion circuit 66 employing a so-called balun transformer. Similar to the arrangement shown in FIG. 1, the RF signal of this example is frequency-converted into an IF signal by a signal from a local oscillator 62, so as to be output from an output terminal 63.

Meanwhile, the conventional mixer input circuit as described above requires that the imbalance-balance conversion circuit employ a transformer, and thus is likely to generate inconvenience, such as, a rise in production costs due to an increase in the number of parts and deterioration of performance due to interference of the conversion coil.

OBJECTS AND SUMMARY OF THE INVENTION

Accordingly, it is an object of the present invention to provide a mixer input circuit in a device such as a tuner in which an imbalance-balance conversion circuit employing a transformer is not required, thereby rendering it possible to carry out imbalance-balance conversion with an inexpensive arrangement and to prevent deterioration of performance.

According to the present invention, there is provided a mixer input circuit comprising a tuning circuit section of an unbalanced type employing a distributed constant line to which an RF signal is inputted, an imbalance-balance conversion section having a central conductor of a distributed constant line combined with a central conductor in the tuning circuit section employing the distributed constant line, and a mixer to which a balanced output signal from the imbalance-balance conversion section is supplied.

It is preferable that with the central conductor on the output side of the imbalance-balance conversion section, the level of balanced output signals be adjusted by moving a grounding center in accordance with positions of parts. It is also preferable that the phase and level of the balanced signals to the mixer be adjusted by inserting and connecting an impedance element between the middle point and the grounding point of the central conductor on the conversion output side, or by connecting the impedance elements to both ends of the central conductor, respectively.

With the mixer input circuit according to the present invention, since the imbalance-balance conversion section made up of the distributed constant line is employed, it is possible to carry out inexpensive imbalance-balance conversion without using expensive parts such as a transformer. Also, deterioration of performance due to the conventional imbalance-balance conversion circuit using a coil or a transformer may be prevented, and such an arrangement is suitable for a reduction in size.

The above and other objects, features and advantages of the present invention will become apparent from the following detailed description which is to be read in conjunction with accompanying drawings.

BRIEF DESCRIPTION OF THE DRAWINGS

FIG. 3 is a block circuit diagram showing a schematic arrangement of an example of a mixer input circuit according to the present invention.

FIG. 4 is a block circuit diagram showing essential portions of the mixer input circuit shown in FIG. 3.

FIGS. 5(A) and 5(B) are diagrams showing examples of specific arrangements of a central conductor employed in the mixer input circuit according to the present invention.

DESCRIPTION OF THE PREFERRED EMBODIMENTS

Figure 1:
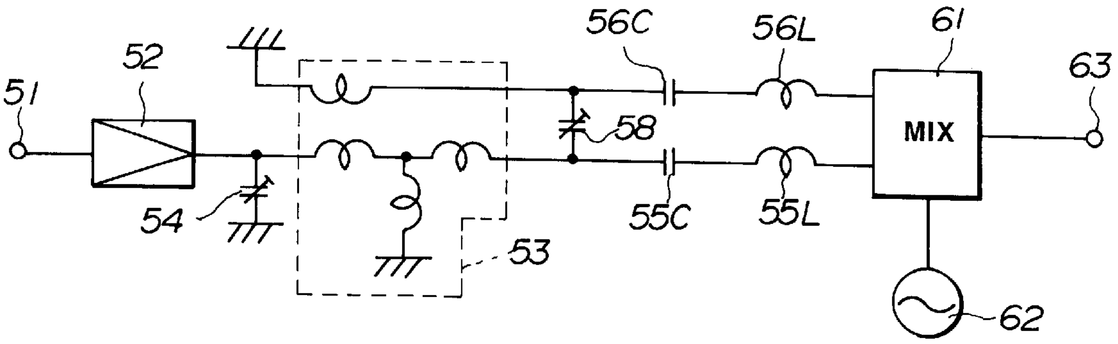
FIG.1 (PRIOR ART)
FIG. 1 is a block circuit diagram showing a schematic arrangement of an example of a conventional mixer input circuit.

FIG. 3 is a block circuit diagram showing a schematic arrangement of a mixer input circuit according to the present inventinon.

Referring to FIG. 3, a radio frequency (RF) signal from an antenna is supplied to an input terminal 11. The RF signal is amplified by an RF amplifier 12, and is then transmitted to a distributed constant tuning circuit section 20 employing a distributed constant line. The distributed constant circuit section 20 includes central conductors 21, 22 of the distributed constant line and trimmer capacitors 23, 24.

Figure 2:
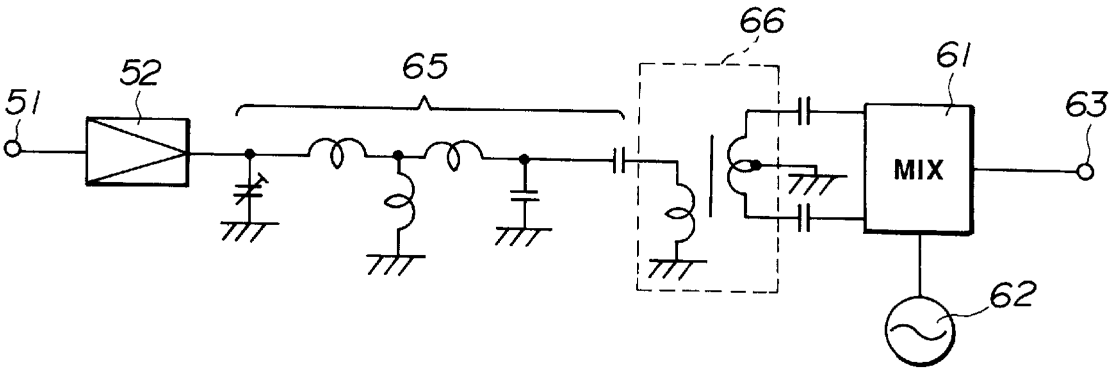
FIG.2 (PRIOR ART)
FIG. 2 is a block circuit diagram showing a schematic arrangement of another example of a conventional mixer input circuit.

The central conductor 22 in the distributed constant tuning circuit section 20 is electromagnetically combined with another central conductor 13 of the distributed constant line, thereby constituting an imbalance-balance conversion section. A middle point or an intermediate tap of the central conductor 13 is grounded, and both ends of the line are connected to a pair of input terminals of a mixer 16 via capacitors 14 and 15 respectively. To the mixer 16, an oscillation output signal is supplied from a local oscillator, not shown, similarly to the aforementioned circuits shown in FIGS. 1 and 2. The input RF signal is mixed with the local oscillation signal, so as to be frequency-converted into a so-called IF signal and then to be output from an output terminal 17.

In the imbalance-balance conversion section made up of the central conductors 22 and 13 of the distributed constant line, for adjusting each of the pair of balanced input signals to the mixer 16 to the same level when grounding the mid point of the central conductor 13, it is preferable to adjust an ideal position of the middle point in accordance with positions of parts. That is, the position of the middle point of the central conductor 13 is variably adjusted as indicated by arrows in FIG. 4. Specifically, several conducting plates 13A and 13B, each having a middle leg portion in a position different from another, are prepared and inserted with respect to a print base plate one after another, as shown in FIG. 5(A) and 5(B), so that a conducting plate to adjust the balanced input signals to the same level is selected. Otherwise, it is also possible to adjust the balanced input signals in a so-called cut-and-try method.

Figure 6:
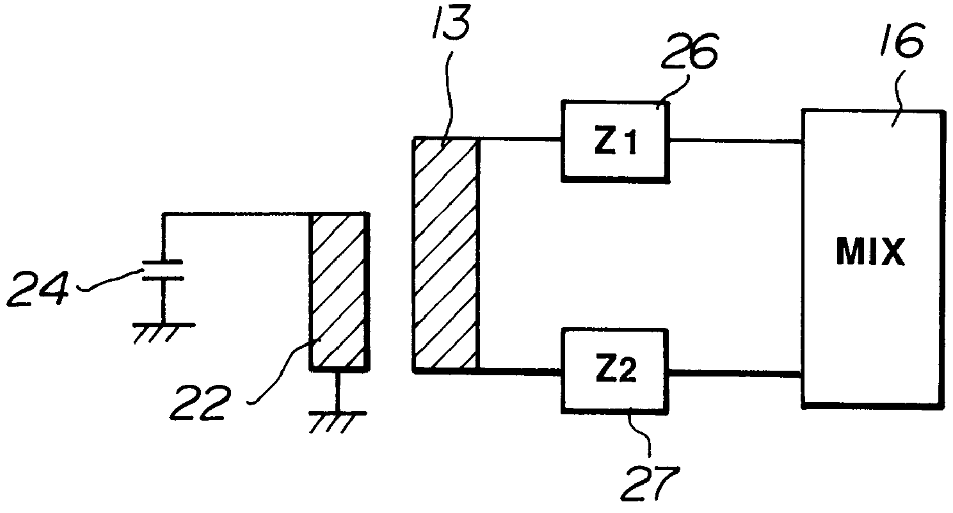
FIG. 6 is a block diagram showing a concrete example of essential portions of the mixer input circuit according to the present invention.

Next, impedance elements 26, 27 of impedance $Z_1$, $Z_2$, respectively, are inserted and connected between both ends of the central conductor 13 and the pair of input terminals of the mixer 16, as shown in FIG. 6, so that the phase and amplitude or level of the balanced input signals can be adjusted. That is, the phases of the balanced input signals are inverted relative to each other, while the amplitudes are adjusted to be equal to each other.

Figure 7:
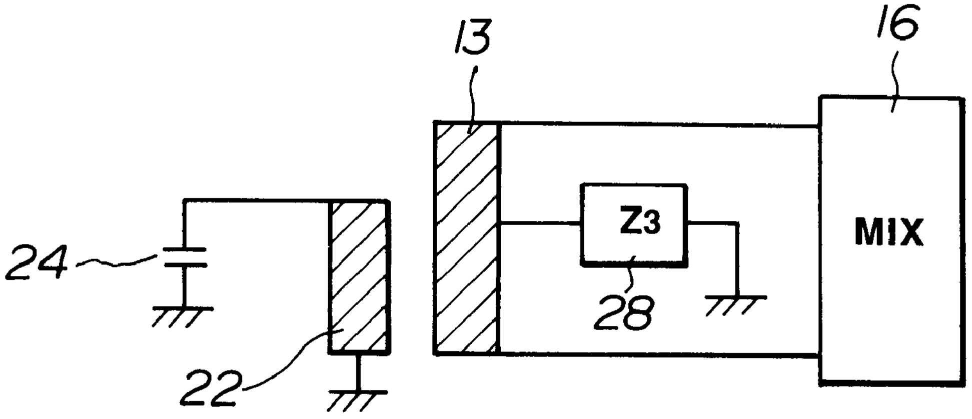
FIG. 7 is a block circuit diagram showing another concrete example of the essential portions of the mixer input circuit according to the present invention.

It is also possible to adjust the level of the balanced input signals by inserting and connecting an impedance element 28 of impedance $Z_3$ between the middle point of the central conductor 13 and the grounding point, as shown in FIG. 7.

Meanwhile, these impedance elements 26, 27, and 28 are each constructed of a resistance and a capacitor.

With the above-mentioned construction, the imbalance-balance conversion section includes the distributed constant line. Accordingly, the imbalance-balance conversion circuit employing a conventional transformer is not required, and a mixer input circuit of the balanced type which is inexpensive, free from deterioration of performance, and suitable for a reduction in size, can be constructed.

The present invention is not limited to the above embodiments. For instance, the tuning circuit section 20 employing the distributed constant line is not limited to the example shown, but may be constructed in various manners, such as, one having a trimmer capacitor and a central conductor.

As is apparent from the above description, according to the mixer input circuit of the present invention, the tuning circuit section to which an RF signal is input is includes a distributed constant line, and the imbalance-balance conversion section is constructed by electromagnetically combining the central conductor in the tuning circuit section with the central conductor for balanced output, so that the balanced output signal is input from the conversion section to the mixer. Therefore, inexpensive imbalance-balance conversion can be carried out without using expensive parts such as a transformer, and there is no need, in designing, to consider deterioration of performance due to the conversion circuit, thereby contributing to a reduction in size.

What is claimed is:

1. A mixer input circuit for converting a signal from a tuning section into a balanced signal and outputting the balanced signal, said mixer input circuit comprising:

a distributed constant tuning circuit section having a distributed constant line including a first central conductor to which an imbalanced RF signal is connected and a second central conductor coupled to said first central conductor;

an imbalance-balance conversion section having a third central conductor of said distributed constant line coupled to said second central conductor of said distributed constant line in said distributed constant tuning circuit; and a mixer having a pair of input terminals to which a balanced output signal from said imbalance-balance conversion section is supplied, wherein a respective phase and a respective amplitude of the balanced output signal are adjusted relative to each other by connecting a pair of impedance elements in series between respective ends of said third central conductor of said distributed constant line and respective ones of said pair of input terminals of the mixer.

2. The mixer input circuit as claimed in claim 1, wherein said third central conductor of said distributed constant line includes a plurality of conducting plates, each having a middle leg portion in a position different from one another, and wherein a position of a middle point of said third central conductor of said distributed constant line is adjusted by inserting the conducting plates one after another and selecting a conducting plate to adjust the balanced output signal to the same level.

3. A mixer input circuit for converting a signal from a tuning section into a balanced signal and outputting the balanced signal, said mixer input circuit comprising:

a distributed constant tuning circuit section with a distributed constant line having a first central conductor to which an imbalanced RF signal is connected and a second central conductor coupled to said first central conductor;

an imbalance-balance conversion section having a third central conductor forming part of said distributed constant line and coupled with said second central conductor of said distributed constant line in said distributed constant tuning circuit section; and a mixer having a pair of input terminals to which a balanced output signal from said imbalance-balance conversion section is supplied, wherein an amplitude of the balanced output signal is adjusted by connecting an impedance element between a middle point of said third central conductor of said second distributed constant line and a grounding point.

* * * * *